Jan. 27, 1948.    J. E. GALL    2,434,918
SUPPORT FOR MULTICONDUCTOR ELECTRICAL CABLES
Filed July 14, 1945
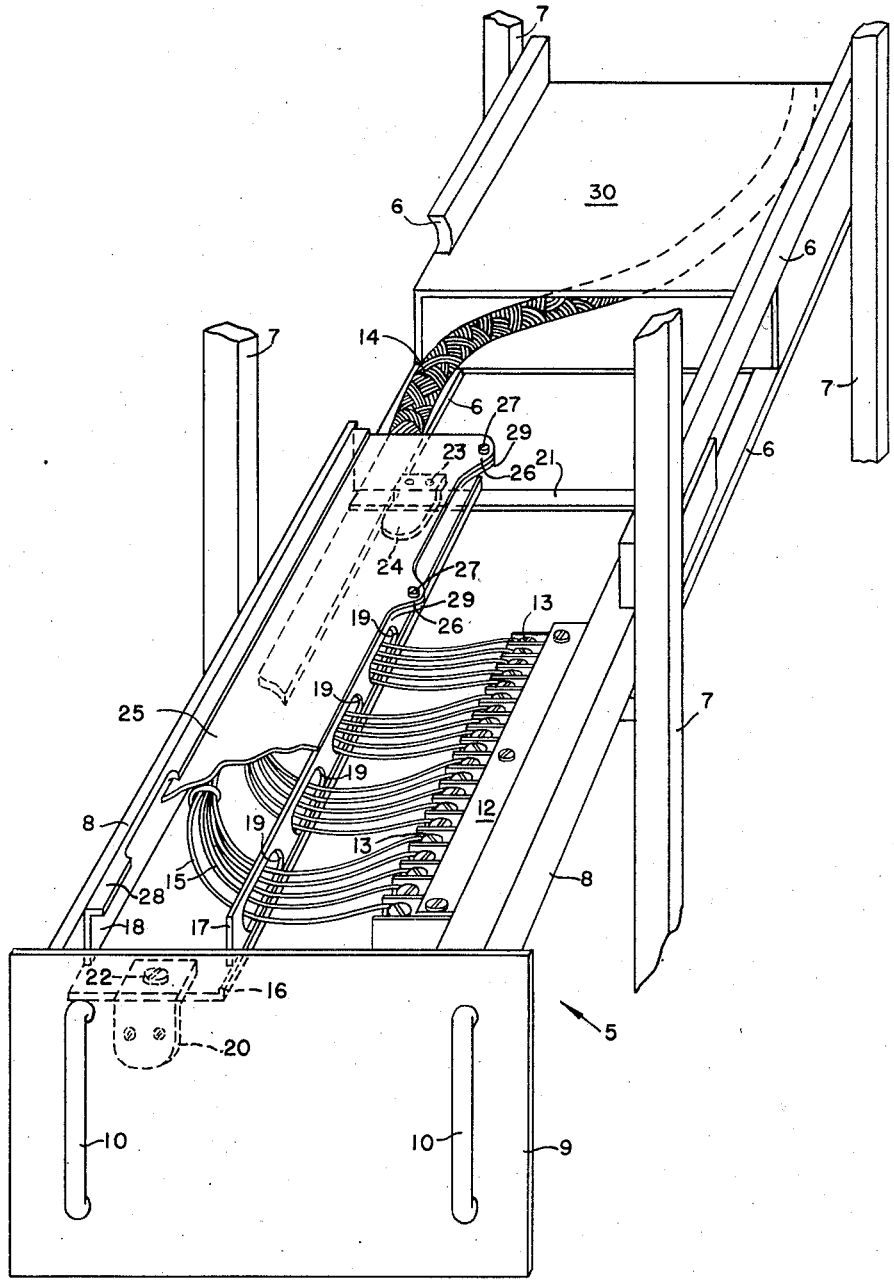
Inventor
JAMES E. GALL
By Ralph L Chappell
Attorney Patented Jan. 27, 1948

2,434,918

UNITED STATES PATENT OFFICE 2,434,918

SUPPORT FOR MULTICONDUCTOR ELECTRICAL CABLES

James E. Gall, Washington, D. C.

Application July 14, 1945, Serial No. 605,159

3 Claims. (Cl. 174—72)

(Granted under the act of March 3, 1883, as amended April 30, 1928; 370 O. G. 757)

This invention relates to article supports, and more particularly to structures for supporting multi-conductor electrical cables.

In some types of electrical apparatus, and particularly in multi-unit electronic apparatus, it is sometimes desirable to make the units thereof readily interchangeable. One method of accomplishing this is to mount the individual units on platforms which may be slid forward from the apparatus housing to permit access to the individual units. Efficient interchangeability requires, in addition, that the cables interconnecting the several units be easy to disconnect and to remove from the unit, and yet that they be so supported that upon substitution of a new unit, reconnection may be readily effected.

In order to accomplish this, one practice has been to bunch the individual conductors together into a group and simply to push the group out of the way when the conductors are disconnected from their associated terminals. In addition to the difficulties involved in relocation of the individual conductors where conductors are so grouped, the strain placed on the individual conductors and their terminals as the unit is moved out of its supporting rack often results in damage to both the terminals and the conductors.

An object of the present invention is to provide an efficient and effective cable support which will permit ready interchangeability of the unit associated therewith without danger of damaging either the cable or the apparatus.

In accordance with one embodiment of this invention, as applied to electrical equipment where the units thereof are supported as hereinbefore described, a duct is provided for receiving and retaining the conductors and is removably mounted on the unit. Apertures are formed along a side of the duct to permit the ends of the conductors to extend therethrough and be connected to the unit terminals. When the unit is pulled forward from the rack, the strain is applied to the duct and to the cable as a whole and no strain is placed on the terminals. After the conductors are disconnected from the terminals, the duct is slid rearward along and into a housing fixed to the apparatus rack, or cabinet, thus removing the conductors and duct from the unit and permitting access to the unit, or exchanging of the unit for another unit. Thereafter, when it is desired to reconnect the several conductors, the duct is pulled forward and locked in position, thereby locating the conductors adjacent the proper terminals.

Other objects and advantages of the present invention will be apparent from the following detailed description taken in conjunction with the single figure, wherein a portion of a unit of electrical apparatus is shown in perspective, having a cable support constructed in accordance with this invention associated therewith.

Referring now to the drawing, a portion of a conventional electrical equipment unit designated generally as 5, is there illustrated. Such units are customarily designed to be pulled forward from an apparatus rack to permit access to the unit or to exchange the unit for another unit. For purposes of illustration, a simple form of sliding support is shown in the drawing comprising two pairs of spaced, parallel horizontally disposed beams 6 which are mounted on the inner sides of four vertically disposed posts 7, which form a portion of an apparatus rack and are disposed substantially at the four corners of a rectangle. The beams 6 serve as ways and each pair slidably supports therebetween a bar, or rail 8, one of which is mounted on either side of the unit and which cooperate to support the unit. The forward ends of the bars 8, as viewed in the drawing, are fixed to and support a front plate 9, which is provided with a pair of handles 10 to facilitate moving the unit into or out of the rack.

A terminal plate assembly 12 is mounted along the inner side of the right hand bar 8, as viewed in the drawing, and is provided with a plurality of terminals 13 from which electrical connection may be made to the various elements which may be assembled in the unit, as is well known in the art.

Ordinarily, as hereinbefore stated, a multi-conductor cable is used to connect the several terminals on the terminal plate to the power supply of the apparatus or to the various other units which may be contained in the apparatus rack. It will readily be apparent from a consideration of the drawing that where a cable of this type is employed, as a unit is pulled forward from the rack, the strain incurred by the normal stiffness of the cable and its components may well cause damage to the terminals or to the terminal plate, or both.

In accordance with the present invention, however, no strain is applied to the terminals as the unit is pulled forward from the rack or is pushed into the rack and at the same time relocation and identification of the individual conductors is greatly facilitated. This is accomplished by providing a support for the multi-conductor cable, designated in the drawing as 14, and having a plurality of conductors 15 disposed therein, the support comprising a duct formed by an elongated rectangular base plate 16 having a pair of side walls 17 and 18 extending upwardly, as shown in the drawing, at substantially right angles thereto. The side wall 17, which faces the terminal assembly 12, is provided with a number of spaced, oval apertures 19 through which groups of the conductors 15 may extend. By grouping the conductors which are to be connected to a particular section of the terminal plate 12, and providing an aperture adjacent each section it will be apparent that the difficulties involved in locating the individual conductors of the cable with respect to the terminals to which they are to be connected is materially reduced.

The duct is removably supported on the unit by a bracket 20 which is mounted on the inner side of the front plate 9 and a cross plate 21 which is mounted between the lower sides of the rails 8 beneath the rear end of the duct. When the conductors 15 are attached to their terminals 13, the duct is normally locked in position by a screw 22 carried by the forward portion of the base plate 16 thereof and threaded into and engaging the upper portion of the bracket 20. In this position, the rear portion of the duct rests on the cross plate 21 and is fixed thereto by a clip 23 mounted on the underside of the base plate 17 and provided with an offset forward portion 24 which when the duct is pulled forward, slips under the cross plate 21 and secures the duct thereto.

In order to provide a readily removable cover for the duct, an elongated rectangular cover plate 25 may be positioned on the upper side of the duct, and is retained in position by a number of lugs 26, integrally formed with the right edge thereof as viewed in this figure, and transversely through which extend screws 27 which threadedly engage suitably positioned lugs 29 integrally formed with and extending at right angles from the upper right edge of the side plate 17. As shown, a flange 28 is integrally formed with the left side wall 18 of the duct and extends to the right therefrom at right angles so that when the screws 27 are tightened the upper left edge of the cover plate 25 engages the underside of the flange and forms a tight but easily removable covering.

The rear portion of the cable 14 extends into a rectangular box-shaped housing 30 which is mounted between the rear portions of the horizontal bars 6. The opposing upper and lower faces of these bars may be recessed slightly so that the housing may be made sufficiently high to receive the bars 8 as the unit is slid into the rack assembly. Thus when the unit is pushed into the rack, the rear portions of the bars 8 enter the housing 30 and the cable 14 will tend to coil itself in the housing. On the other hand, if while the unit 5 is pulled forward from the rack, it is desired to disconnect the conductors 15 from the terminal assembly 12, the ends of the conductors are disconnected from the terminal screws 13, the bracket screw 22 is removed and the duct is slid rearwardly into the housing 30, which then serves as a temporary support for the duct. Thereafter when the duct is moved back into position, by virtue of the spaced apertures 19 in the side wall of the duct through which the conductors 15 extend, relocation of the ends of the conductors with their associated terminals is greatly facilitated. In the event that it is desired to change the location of any of the conductors, the screws 27 which hold the cover plate 25 of the duct in place are removed, the cover plate is then removed permitting access to the duct interior.

Where herein the various parts of the invention have been referred to as being located in a right or left, or upper or lower position, it will be understood that this is done solely for the purpose of facilitating description, and that the references relate only to the relative position of the parts as shown in the accompanying drawing.

While but one embodiment of this invention has been shown and described, it will be understood that many changes and modifications may be made therein without departing from the spirit or scope of the present invention.

The invention described herein may be manufactured and used by or for the Government of the United States of America for governmental purposes without the payment of any royalties thereon or therefor.

What is claimed is:

1. In a support for a readily interchangeable electrical unit, a rack, a unit removably mounted therein having a plurality of terminals associated therewith, a multi-conductor cable fixedly mounted on said rack and extending therefrom a length sufficient to permit electrical connection thereof to said unit terminals while said unit is partially removed from said rack, a support for the terminal-connecting end of said cable including a duct removably mounted on said unit, adjacent to said terminals and having formed in a side thereof adjacent to said terminals at least one aperture to permit a conductor to extend therethrough and to be connected to a terminal, and a recess in said rack adapted to receive said duct and said cable while said unit is positioned within said rack or while the terminals of a unit are disconnected from said cable and the unit is removed from said rack.

2. In a support for a readily interchangeable electrical unit, a rack, a unit removably mounted therein having a plurality of terminals associated therewith, a multi-conductor cable fixedly mounted on said rack and extending therefrom a length sufficient to permit electrical connection thereof to said unit terminals while said unit is partially removed from said rack, a support for the terminal-connecting end of said cable including a duct removably mounted on said unit adjacent to said terminals, said duct including a base plate, side plates mounted along opposed edges of said base plate and a removable cover, said duct having formed in one of said side plates adjacent to said terminals at least one aperture to permit a conductor to extend therethrough and to be connected to a terminal, and a recess in said rack adapted to receive said duct and said cable while said unit is positioned within said rack or while the terminals of a unit are disconnected from said cable and the unit is removed from said rack.

3. In an electrical apparatus having a unit associated therewith adapted to be pulled forward from said apparatus, said unit having a terminal assembly mounted thereon, a multi-conductor cable support comprising a duct for supporting a portion of said cable adjacent to said terminal assembly and having formed in a side thereof adjacent to said terminal assembly at least one aperture to permit a conductor to extend therethrough and to be connected to said terminal assembly, said duct being removable from said unit and adapted to be moved into said apparatus while said unit is moved forward from said apparatus.

JAMES E. GALL.

REFERENCES CITED

The following references are of record in the file of this patent:

UNITED STATES PATENTS

| Number | Name | Date |
| --- | --- | --- |
| 968,173 | Luschka | Aug. 23, 1910 |
| 1,330,811 | Konigslow, Sr. | Feb. 17, 1920 |
| 1,574,297 | Lilleberg | Feb. 23, 1926 |

FOREIGN PATENTS

| Number | Country | Date |
| --- | --- | --- |
| 540,618 | Great Britain | Oct. 23, 1941 |